Dec. 1, 1931.  E. KNAPP ET AL  1,834,100
TRACTOR POWER TAKE-OFF ATTACHMENT
Filed Dec. 2, 1927
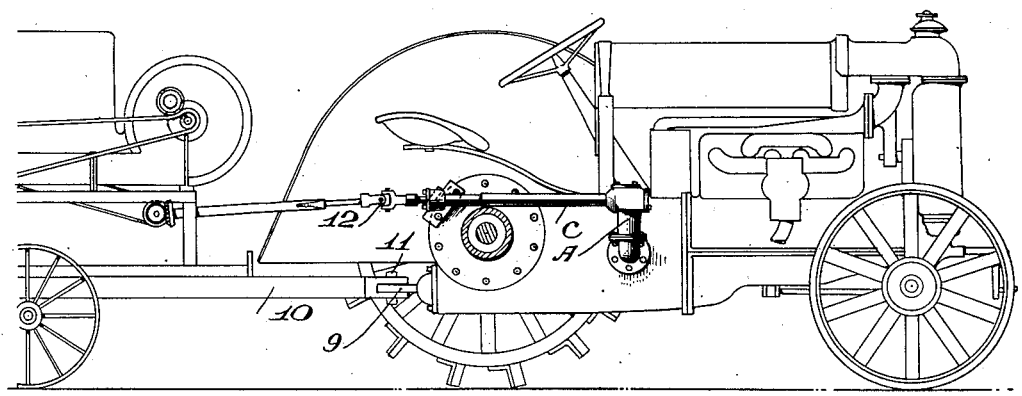
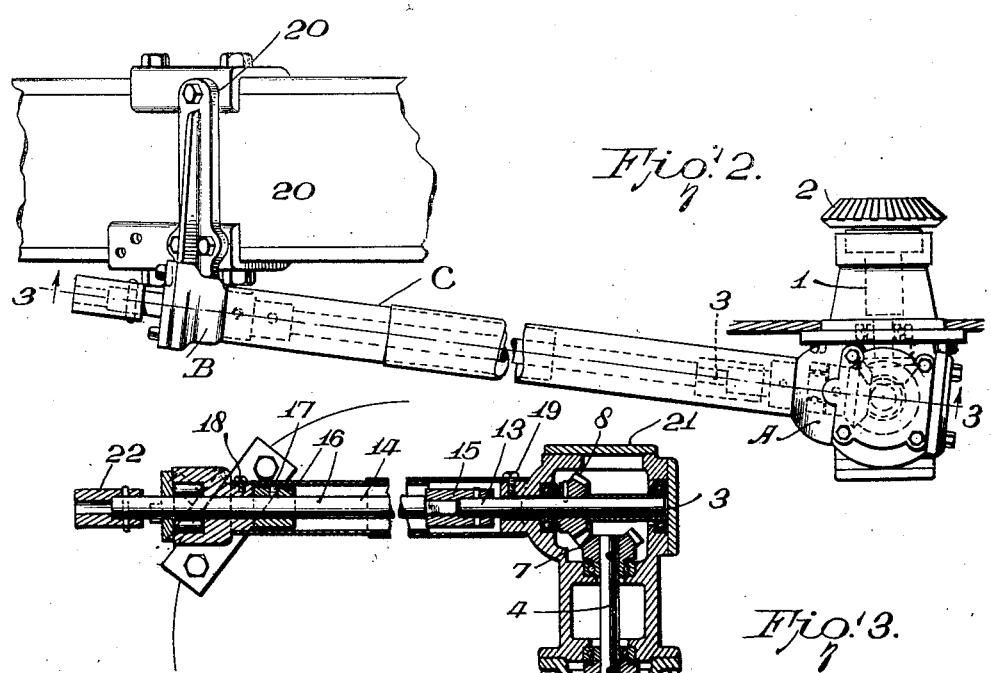
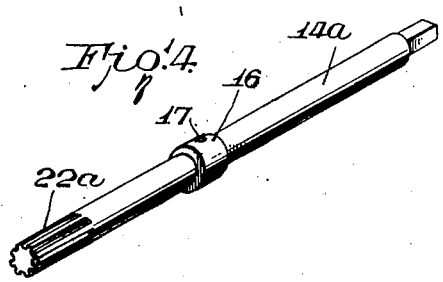
INVENTORS
Edgar Knapp & Carl G. Allgrunn
BY
A. S. McDaniel
THEIR ATTORNEY.

Patented Dec. 1, 1931

1,834,100

UNITED STATES PATENT OFFICE

EDGAR KNAPP AND CARL G. ALLGRUNN, OF MIDDLEPORT, NEW YORK, ASSIGNORS TO NIAGARA SPRAYER COMPANY, OF MIDDLEPORT, NEW YORK, A CORPORATION

TRACTOR POWER TAKE-OFF ATTACHMENT

Application filed December 2, 1927. Serial No. 237,202.

This invention relates to tractor mechanisms, and more particularly to devices for transmitting power from the tractor motor to a driven apparatus.

The use of tractors, both on the farm and in the factory, for some time has been becoming more and more universal. In recent years this increased use has been stimulated by the appearance in the market of a large number of devices for cooperating with the tractor to perform various tasks other than mere draft work. Many of these devices are designed to be driven from the motor of the tractor, but their use has been somewhat limited by the lack of uniformity in the means provided on various makes of tractors for driving these attachments, one of the most popular tractors, for example, being provided with a belt pulley beside the motor as its only "power take off". Certain other tractors have only a drive shaft at the front or back of the tractor; and these shafts vary widely in form some being externally splined, while some are internally squared and yet others keyed or flanged. The result of this situation has been that the user is limited in his choice to such devices as are designed for use with his particular tractor, and the manufacturer's sales are therefore limited to only a small part of the market which should be naturally available to him.

The present invention contemplates a power take-off device for use with a standard tractor, which will transmit the power for driving various apparatus used in connection with the tractor.

A further object of the invention is to provide such a device which can be quickly adapted for use with the various types of standard connections.

Other objects and advantages will be apparent from the following description, when considered in connection with the accompanying drawings, wherein Figure 1 is a side elevation of a tractor and trailer attachment with one rear wheel of the tractor cut away to show a power take-off device, made in accordance with this invention, in operative position for use with the driven device on the trailer;

Fig. 2 is a top elevation with parts of the tractor broken away;

Fig. 3 is a longitudinal sectional view taken on line 3—3 of Fig. 2; and

Fig. 4 is a perspective view of a shaft adapted to be used with a different power connection.

Now referring to the drawings in detail, the letter A designates a housing adapted to be secured to the transmission wall of the tractor and to be secured in position over an opening therein. Such an opening is ordinarily provided in certain tractors for the purpose of attaching a so-called "power take-off" such as a belt pulley.

In said housing A is rotatively mounted a stub shaft 1 carying a gear 2 adapted, when said housing is secured in position, to be driven from a gear in the transmission assembly of the tractor.

In the opposite end of the housing A above the shaft 1 is journalled a main drive shaft 3. This main shaft is adapted to be driven from shaft 1 through an intermediate transmission means, such as the gear 5 on the shaft 1, the shaft 4 with its gears 6 and 7, and the gear 8 on the shaft 3, all carried in the housing A.

At the rear of the tractor a suitable drawbar 9 is provided, to which the tongue 10 of a trailer or other drawn apparatus may be pivotally secured. In order to permit free turning of the tractor relative to the trailer, it is important to have the drive shaft pivoted on the same axis as the drawbar and tongue. To effect this result, the drive shaft 3 is mounted in the housing A at an angle to the longitudinal axis of the tractor such that, when the device is secured in position, the rear end of the shaft will be approximately above the drawbar pivot 11 and adjacent the vertical axis thereof. By positioning the shaft in this manner with its end above the drawbar pivot, a universal joint 12 connected thereto will be co-axial with said pivot and, consequently, will easily adjust itself to any variations in alignment between the tractor and a trailer attachment, and it is thereby made possible to operate a device while it is being drawn by the tractor. The vertical shaft 4 with its bevel gear connections serves as an additional means of facilitating operation while the tractor is being driven and steered around turns. By virtue of this intermediate shaft it is possible to have the main shaft 3 clear the rear axle housing of the tractor without deviating from the horizontal, and consequently without exceeding the angle which can be easily accommodated by a universal joint.

In order that the drive shaft 3 may be adapted for use with apparatus designed for different types of transmission connections, the shaft 3 is made with a fixed section 13, a removable and interchangeable section 14 and a coupling member 15. It will be understood that the coupling may be readily accomplished by sliding one section into or out of the coupling member 15.

A thrust washer 16 is slidably mounted on the shaft 14 and locked in position on the shaft by a lock screw 17. This washer, by bearing against the end of housing B, holds the removable section 14 against withdrawal from the coupling.

Arranged between the fixed housings A and B, and encircling the shaft 3, is a tubular housing C; which tubular housing is preferably made up of telescoping sections normally secured in extended relation by screws 18 and 19.

The housing B is preferably secured to the rear axle housing of the tractor and may be secured in position by any suitable bracket such as 20 bolted to the axle housing near the center thereof, as shown in Fig. 2.

As the housing A will frequently replace a foot bracket, the top 21 of the housing A is made flat to serve this additional function.

In order that the power take-off device of this invention may be used with apparatus having various types of transmission connections, an additional shaft section 14ª may be interchanged with the section 14. One form of shaft is illustrated in Fig. 4; similar shaft sections may be provided for each different type of connection.

In use with a tractor provided with opening and gear for a belt pulley attachment, the cover plate or pulley housing is first removed and the housing A is bolted in its place. This bring the gear 2 into mesh with a bevel gear on the transmission drive shaft of the tractor. The opposite end of the housing unit is then secured to the rear axle housing of the tractor by means of the bracket 20. The device being then in position for operation, may be connected to any desired apparatus by attaching a suitable universal joint or other transmission element to the end 12 of the shaft section 14.

In some cases the transmission element of the driven apparatus may be designed for use with a different form of shaft. It will then only be necessary to replace the shaft section 14 with one of suitable form. To accomplish this change, the screw 18 is removed and the housing C telescoped. The lock screw 17 is then removed from the washer 16 and the shaft section is withdrawn longitudinally. In placing another shaft section the procedure is reversed. The shaft 14ª is slipped through the housing B and the thrust washer 16. The squared portion of the shaft is then fitted into the coupling member 15; the thrust washer secured in position by setting down the screw 17, and the telescopic housing replaced and secured by the screw 18. Thus by a simple operation any suitable shaft may be quickly put in position or removed.

While the housings A, B and C are shown as separable parts, it will be understood that they might be made as a unit and are so considered in the claims.

It will be obvious that variations may be made in the details of construction without departing from the spirit of the invention as set forth in the appended claims.

What we claim is:

1. In a device of the class described, a tractor having a suitable drawbar, a trailer pivotally connected to said drawbar, an apparatus mounted on said trailer having a drive shaft adapted to be driven from a rotating source of power, a universal joint connected to the drive shaft of said apparatus, a power shaft on the tractor accessible from a position spaced from the longitudinal center of the tractor and a power take-off device connected to the opposite end of said universal joint and positioned so that the pivot of the universal joint and the pivot of the drawbar connection will be substantially co-axially aligned, the power take-off device comprising a stub shaft driven from a rotating part of the tractor adjacent the motor thereof, a main shaft extending from said universal joint to a point above the stub shaft, and means for transmitting power from the stub shaft to the main shaft.

2. In a device of the class described, a housing adapted to have one end mounted on the rear axle housing of a tractor and its opposite end mounted adjacent the motor thereof, a stub shaft mounted in said housing, means on one end of said shaft for driving it from a rotating part of the tractor, a second shaft mounted in said housing, and means for transmitting power from the first named shaft to the second, the last named shaft having its opposite end terminating adjacent the vertical axis of a drawbar pivot of the tractor.

3. In a device of the class described, a housing adapted to have one end mounted on the rear axle housing of a tractor, and its opposite end mounted adjacent the motor thereof, a stub shaft mounted in said housing, means on one end of said shaft for driving it from a rotating part of the tractor, a second shaft mounted in said housing, and means for transmitting power from the first named shaft to the second, the last named shaft being substantially horizontal and having its opposite end terminating adjacent the vertical axis of a drawbar pivot of the tractor.

4. In a power take-off device for tractors, a shaft adapted to enter the transmission housing of said tractor and having a gear secured to each end thereof, the gear on the inner end adapted to be driven from a gear on the transmission drive shaft of the tractor, a vertical shaft having a gear secured to each end, one of said gears being driven by the outer gear on the first shaft, a substantially horizontal main drive shaft having at its forward end a gear engaging the second gear on the vertical shaft and having its opposite end terminating adjacent the vertical axis of a drawbar pivot of the tractor.

5. In a power take-off device for tractors, a shaft adapted to enter the transmission housing of said tractor and having a gear secured to each end thereof, the gear on the inner end adapted to be driven from a gear on the transmission drive shaft of the tractor, a vertical shaft having a gear secured to each end, one of said gears being driven by the outer gear on the first shaft, a substantially horizontal main drive shaft having at its forward end a gear engaging the second gear on the vertical shaft, said main shaft being mounted at an angle to the longitudinal axis of the tractor so as to bring the rear end of said shaft adjacent said longitudinal axis.

6. In a power take-off device for tractors, a rotating element driven by the motor of the tractor and extending out through the housing of said tractor, a substantially horizontal shaft extending thereabove and rearwardly to a point adjacent the vertical axis of a drawbar pivot, and means for transmitting power from the first named shaft to the second.

7. In a power take-off device, transmission means driven by the tractor motor, a shaft driven thereby comprising a longitudinally fixed section, a longitudinally removable section, means for coupling the sections against relative rotation, and means on said removable section comprising a releasable thrust collar for holding the sections in coupled relation.

8. In a power take-off device, transmission means driven by the tractor motor, a shaft driven thereby comprising a longitudinally fixed section, a removable section and means for coupling the sections against relative rotation, and means on said removable section comprising a releasable thrust collar for holding the sections in coupled relation, a fixed housing enclosing the first named transmission means and one end of the sectional shaft, a fixed housing adjacent the other end of the fixed shaft, and a telescopic tubular housing extending between the two fixed housings, said tubular housing being adapted to telescope to expose the releasable thrust collar.

9. In a power take-off device for tractors, a drive shaft, means for transmitting power thereto from the tractor motor, and a housing therefor, the drive shaft comprising a longitudinally fixed section, a section adapted to be readily removed and interchanged with other similar sections, means for coupling the sections together, and means comprising a releasable thrust washer for maintaining the sections in coupled relation; the housing comprising a member at each end of the drive shaft, one of said members having a bearing surface adapted to cooperate with the thrust washer to limit longitudinal movement of the removable section, and a telescopic tubular member between the fixed members adapted to enclose the shaft or to expose the thrust washer when it is desired to release the thrust washer.

10. In a device of the class described, a fixed housing, a second fixed housing spaced therefrom, a tubular housing mounted therebetween adapted to completely enclose the part of the shaft between the fixed housings or, when desired, to be partially withdrawn without disturbing the remaining parts, a drive shaft journalled in the fixed housings comprising a longitudinally fixed section, a removable section, means for coupling said sections in power transmitting relation, and releasable means exposed by partial withdrawal of the tubular housing for holding the sections in coupled relation.

11. In a device of the class described, a housing adapted to have one end supported by the main axle housing of a tractor and its opposite end mounted at one side of the motor of the tractor, a stub shaft within said housing, means extending out of the motor at the side thereof and in operative connection with the stub shaft to rotate the same, a second shaft mounted in the said housing, and means for transmitting power from the shaft to the second shaft, the housing extending backwardly and inwardly from the side of the motor, whereby said second shaft has its opposite end terminating adjacent the vertical axis of a drawbar pivot of the tractor.

In testimony whereof we affix our signatures.

EDGAR KNAPP.
CARL G. ALLGRUNN.